United States Patent [19]

Land

[11] 4,214,285
[45] Jul. 22, 1980

[54] SOUND MOTION PICTURE SYSTEM HAVING CONCENTRATED AUDIO SYSTEM

[75] Inventor: Edwin H. Land, Cambridge, Mass.

[73] Assignee: Polaroid Corporation, Cambridge, Mass.

[21] Appl. No.: 899,782

[22] Filed: Apr. 25, 1978

[51] Int. Cl.² ............... G11B 5/008; G11B 15/38; G11B 15/66
[52] U.S. Cl. ............................ 360/90; 352/31; 360/130.21; 360/95
[58] Field of Search .......... 360/90, 3, 93, 91, 130, 360/95, 130.2, 130.21; 352/31; 226/95

[56] References Cited

U.S. PATENT DOCUMENTS

| | | | |
|---|---|---|---|
| 2,747,025 | 5/1956 | Selsted | 360/130 |
| 2,954,911 | 10/1960 | Baumeister et al. | 360/90 |
| 3,134,527 | 5/1964 | Willis | 360/90 |
| 3,443,039 | 5/1969 | Bygdnes | 360/90 |
| 3,604,790 | 9/1971 | Land et al. | 352/29 |
| 3,848,977 | 11/1974 | Scholz | 352/14 |
| 3,850,512 | 11/1974 | Scholz | 352/14 |

FOREIGN PATENT DOCUMENTS 712854  9/1972  Italy ............................ 360/95

OTHER PUBLICATIONS

C. E. Lowman, Magnetic Recording, McGraw-Hill Book Company, 1972, pp. 42, 96-97, 237-238.

Primary Examiner—Alfred H. Eddleman
Attorney, Agent, or Firm—David R. Thornton

[57] ABSTRACT

An audio system having an audio tape drive system and transducer intercoupled in a single unit of concentrated mass with tape contact confined to a short length of one side of the magnetic tape. A magnetic transducer head is mounted within a drive capstan so that both head and capstan contact essentially the same short length of the magnetic tape and a vacuum system is employed to draw the tape against both to thereby concentrate the mass and eliminate spaced tape engaging components so as to reduce tape flutter. Preferably, a capstan drive motor, a capstan, and a vacuum pump are mounted together and operate on an axis passing through the center of the capstan so as to concentrate the mass of the system at this point. The capstan includes peripheral openings designed to overlie one or both of the longitudinal film margins for delivering the vacuum which attracts the tape against both the capstan and the transducer which is located within a slotted portion of the capstan so as to ride on the central portion of the tape during advancement of the latter.

9 Claims, 5 Drawing Figures

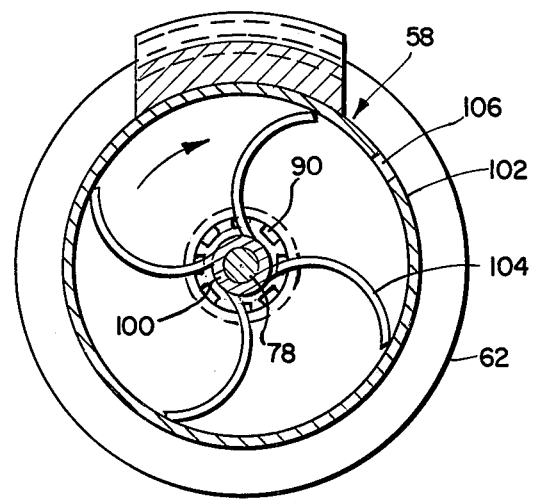
FIG. 3
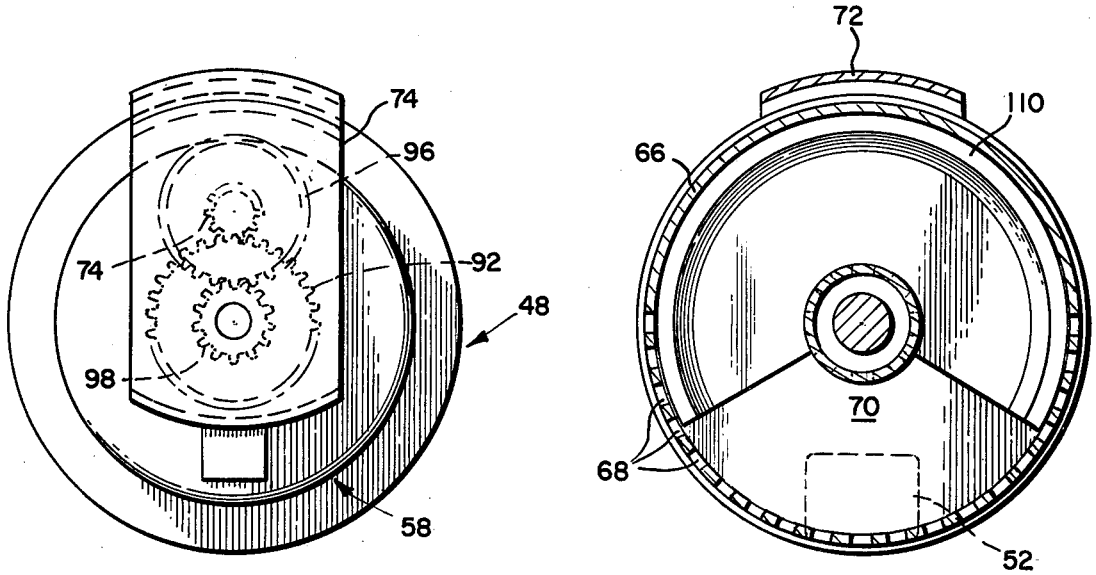
FIG. 4
FIG. 5

SOUND MOTION PICTURE SYSTEM HAVING CONCENTRATED AUDIO SYSTEM

BACKGROUND OF THE INVENTION

This invention relates to an audio system and, more particularly, to an improved sound motion picture system.

One problem associated with audio systems which utilize relative motion between an audio recording medium, such as a magnetic tape, and an audio transducer is frequency modulation resulting from relative motion between components of the system and particularly from speed variations of the recording medium. This problem is particularly evident in tape systems wherein the flexibility of the recording medium contributes to a lack of consistent transducer engagement and constant linear velocity of the medium so as to produce both audio flutter and drift.

In high fidelity equipment, flutter and drift are generally reduced by complex audio-drive mechanisms in conjunction with corrective electronics which significantly increase the cost and size of this equipment and require maintenance of, and precise adjustment of, the components such that they are not well suited to high quality, mass produced, portable devices. Additionally, these problems are further complicated when the audio system is combined with visual reproduction, such as in audio-visual systems wherein the audio portion of the system requires constant tape velocity and the motion picture generally utilizes intermittent motion.

The use of a vacuum for high speed magnetic tape systems to either support the tape for transducer engagement or for driving the tape is known as, for example, in high speed vidio equipment as described in the book "Magnetic Recording" authored by Charles E. Lowman and published in 1972 by McGraw-Hill, Inc. For instance, page 42, FIGS. 5–9 of this book illustrates a magnetic tape recording system wherein a vacuum guide is employed to support the tape beneath the transducer head. Furthermore, on page 97, FIGS. 8-3 and page 237, FIGS. 12-16 thereof, vacuum capstans are illustrated. These systems are, of course, relatively costly and complex arrangements which, while suited to high speed tape equipment, do not particularly alleviate the difficulties of cost, portability and construction noted above.

Consequently, it is an object of this invention to provide a highly efficient audio tape system having reduced tape instability.

A further object is to provide a compact audio system having minimum flutter.

Another object is to provide an audio-visual system having reduced audio tape instability.

Still another object of this invention is to provide a compact audio tape drive and recording system suitable for use with audio-visual cassettes.

A still further object is to provide an improved audio tape system employing vacuum produced forces.

SUMMARY OF THE INVENTION

Briefly, the invention provides a tape drive and transducer arrangement combined in a single concentrated mass for providing tape contact over a combined length of one audio tape so as to reduce tape instability and its resulting frequency modulation. In the illustrated embodiment, a magnetic transducer head is disposed within a rotating, vacuum capstan in fixed relation to the centrally located portion of the tape which is held against the capstan and the stationary head by air pressure resulting from a vacuum which is internal to the capstan and presented to the tape by peripheral openings which overlie the tape margins. Preferably, an electrical drive motor and vacuum pump are mounted on a common axis with the capstan to concentrate the mass and thereby reduce imbalances in the system.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

FIG. 3 is a view in section taken along the line 3—3 of FIG. 2;

FIG. 4 is a view in elevation of one end of the drive system as seen along line 4—4 of FIG. 2; and FIG. 5 is a view in section taken along the line 5—5 of FIG. 2.

DESCRIPTION OF THE ILLUSTRATED EMBODIMENTS

Figure 1:
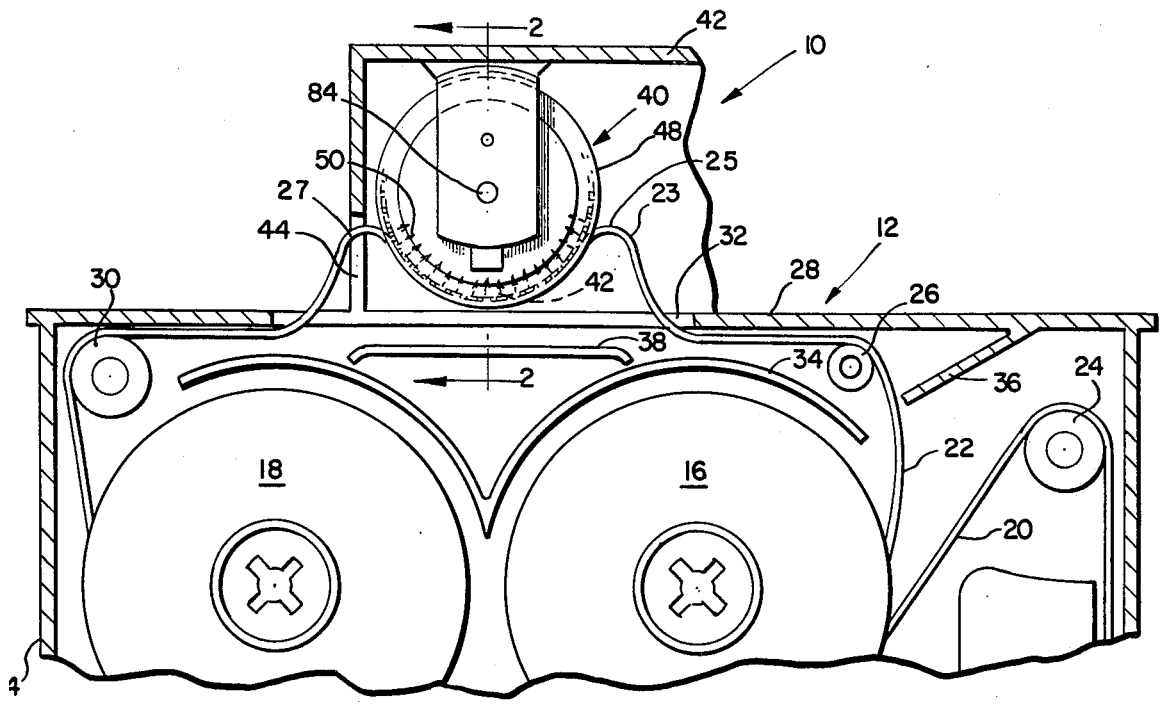
FIG. 1 is a view in elevation of a tape drive system in conjunction with an audio-visual cassette with portions cut away to reveal the interior of both.

In FIG. 1 of the drawings, an audio system 10 is shown in operational engagement with an audio film cassette 12 of the type shown and described in U.S. patent application Ser. No. 869,131, filed on Jan. 13, 1978, in the name of Edwin H. Land et al, wherein an audio-visual cassette system is described in which a film strip and magnetic tape are interwound on a common supply spool.

The cassette 12 is similar to the embodiment shown in FIG. 8 of the above-noted application and comprises a substantially parallelepiped housing 14 having a supply spool or reel 16 and a takeup spool or reel 18 to which opposite ends of a pair of elongated strips or webs 20 and 22 are attached. One web 20 comprises a photographic film strip which extends from the supply spool 16 around an idler roller 24, through an exposure station (not shown) and to the supply spool 16. In a similar manner, the web 22 comprises a tape, carrying audio recording material such as magnetic stripes in its central portion, which extends from the supply spool 16 around an idler roller 26, and beneath the top surface 28 of the cassette housing 14 to a second idler roller 30 from which it passes to the takeup spool 18. An opening 32 is provided in the top surface 28 to permit access to the tape for audio recording and playback as later explained. Light baffles 34 and 36 are provided to shield the photographic film 20 from light entering the opening 32. An elongated support member 38 is provided to support and guide the tape when audio operations are not being performed, as for example, when the system is being rewound to its initial condition wherein a large portion of both webs are stored on the supply spool 16.

Mounted on the cassette 12 is the audio recording and playback system 10 comprising a transducer and tape drive assembly 40 mounted within a housing 42 which is positioned on the top surface 28 of the cassette with an opening 44 therein in substantial registration with the cassette opening 32 so that a portion 23 of the audio tape 22 may be drawn into the audio system 10 and audio information recorded thereon or extracted therefrom. Prior to explaining the audio system in detail, it should be noted that the system 10 is intended to be either a permanent portion of a projector system or an accessory thereof as explained in the aforementioned copending application, and includes audio reproduction or playback circuitry and components, such as for example, a microphone or speaker (not shown) which cooperate with a transducer head 52 of the system 10.

Advantageously, as later explained in detail, the audio tape 22 is drawn out of the cassette 12 by means of a vacuum which also insures tape engagement with the transducer and drive arrangement so that the system provides a simple self-threading device particularly suited for use with a cassette arrangement wherein both ends of the tape are permanently retained within the cassette. In this regard, as later explained with regards to FIGS. 2-5, the transducer and drive assembly 40 includes a capstan 48 against which the tape 22 is drawn by a vacuum as designated by the arrows 50 such that the tape will be advanced in accordance with rotation of the capstan 48. A magnetic transducer head 42 is located within the capstan 48 so as to be engaged by the surface of the tape 22 as the latter is advanced by the transducer and drive unit. Hence, the capstan 48 provides means responsive to tape engagement for advancing the tape while the vacuum provides means for urging the tape against the capstan and its contained transducer.

Figure 2:
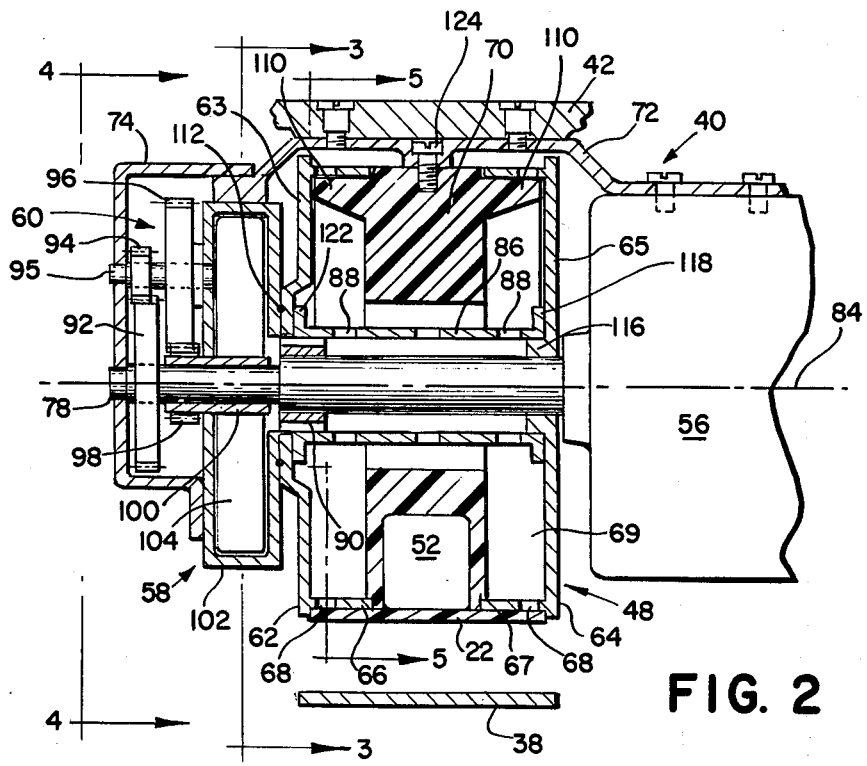
FIG. 2 is a view in section taken along the line 2—2 of FIG. 1.

As can be seen from FIG. 2, in addition to the capstan 48 and the magnetic head 52, the transducer and drive unit 40 also comprises a motor 56, a vacuum pump 58 and a gear train 60. The capstan 48 is made up of two spaced elements or capstan members 62 and 64 which are configured to engage and advance the lateral margins of the tape 22 as later explained with regards to operation of the device.

Each of the capstan members 62 and 64 includes a circular side wall, designated 63 and 65, respectively, and an inwardly directed, cylindrical wall portion, designated 66 and 67, respectively. Circumferentially spaced around the cylindrical wall portions of the capstan are openings 68 which communicate with the hollow interior 69 of the capstan. A support member 70, located between the capstan members 62 and 64, fixedly maintains the transducer head 52 between the capstan members and also (as later explained) controls the air flow within the hollow interior 68 of the capstan so that only openings at the bottom of the capstan, i.e., near the head 52, feel the full force and effect of the vacuum. A frame member or bracket 72 connects the motor 56 to the support 70 and the pump 58. Additionally, the bracket 72 extends to a gear frame 74 which extends across and supports the gear train assembly 60. Finally, it should be noted that the capstan side walls 63 and 65 extend slightly beyond the circular wall portions 66 and 67 to provide side guides for the tape 22.

In this arrangement, the output shaft 78 of the motor 56 extends through the spaced capstan members 62 and 64, the interposed support member 70 and the pump 58 to a journalled bearing 82 in the gear frame 74 such that the mass of the structure is concentrated along the axis 84 which passes through the center of the motor, the capstan and the pump arrangement.

To provide a vacuum, air pressure is reduced within the interior of the capstan chamber 68 by means of the pump 58 which exhausts gasses from within the interior of a sleeve 86; the sleeve being in communication with the capstan chamber 68 by means of openings 88 and a castellated support ring 90 (see FIG. 3) which supports the sleeve on the shaft 78 where the sleeve adjoins the pump.

Prior to completing the description of the capstan assembly, the pump 58 and the gear train 60 will be explained with regards to FIGS. 2, 3 and 4. The gear train 60 is utilized to increase the pump speed over that of the motor. In this regard, in this embodiment the motor is utilized to directly drive the capstan and hence advance the tape at a constant low speed, while driving the pump at a relatively high speed to produce a sufficient vacuum. Consequently, as shown in FIG. 4, the gear train 60 consists of a relatively large spur gear 92, mounted directly on the shaft 78 for rotation therewith, in driving engagement with a small spur gear 94. The latter is fixed on a common shaft 95 with still a further large spur gear 96, which is in driving engagement with a pump gear 98. Hence, the motor speed as delivered by the output shaft 78 is first multiplied by the combination of the spur gears 92 and 94, since the latter is rotated at relatively high speed as compared to the shaft rotation, and again multiplied by the spur gear 96 which, while it rotates at the same speed as the gear 94, is of large diameter and, in turn, drives the pump gear 98 at still further increased speed.

As shown in FIG. 2, the pump gear 98 is mounted on a sleeve member 100 which extends through and is journalled within the pump casing 102. In this arrangement, the sleeve 100 provides a bearing arrangement with respect to both the output shaft 80 (which turns at a different speed than the sleeve 100) and to the pump casing 102 which is stationary. Of course, separate sleeve bearings or the like could be used for these purposes. Within the pump casing 102, a plurality of vanes 104 (see FIG. 3) are mounted around the circumference of the sleeve 100 to provide (upon rotation) air flow from the pump interior and out of pump outlet 106 provided in the perimeter of the pump 58. Construction of the pump is such that rotation of the vanes 104 in a clockwise direction as viewed in FIGS. 1 and 3 will reduce the air pressure at the center of the pump which is in communication with the interior of the capstan by means of the castellated ring 90 and the sleeve 86.

Turning once again to the capstan structure itself, it can be seen from FIGS. 2 and 5 that the central support 70 is constructed with cantilevered ear portions 110 which are closely spaced in underlying relation to the openings 68 over 180 to 240 degrees of the circumference of the capstan so that only the openings 68 located at the bottom of the capstan in adjoining relation to the transducer 52 are operable to attract and hold the tape against the capstan perimeter. That is, the support member 70, and particularly its ear portions 110 reduce the air flow around the one-half of the capstan which is intended to be out of contact with the magnetic tape 22 at any given time. Since the support is fixed while the capstan members 62 and 64 rotate around it, the pressure differential due to the vacuum pump 58 is substantially only effective in the area of the capstan passing by the transducer 52. To additionally maintain the vacuum, a rotary seal 112 is provided between the capstan member 64 and the pump casing 102.

In operation of the above-described system, the cassette is first inserted within a projector or camera apparatus, as explained with regards to FIG. 8 of the aforementioned copending application. In this regard, the camera and projector apparatus includes the novel audio system herein described as either a permanent portion of the operating apparatus or as an accessory thereof such that, once the cassette is placed in an operating position in a camera or viewer, the system 10 is either automatically located in the position shown in FIG. 1 or, in the case of an accessory, is placed there by the operator. The system 10 may be electrically synchronized by any suitable means (not shown) to the camera or viewer apparatus so that the sound unit will be energized during operation of the apparatus to drive the film strip in its forward direction. The latter initiates rotation of both spools so that the photographic film 20 is advanced across its photographic station (not shown) while the tape 22 is advanced across the supporting member 28 and the cassette opening 32 which serve as the audio station. As the apparatus begins photographic operations with the film strip, the motor 56 is energized and, in turn, drives the capstan 48, both its first and second members 62 and 64 and also the vacuum pump 58. The latter, in turn, reduces the pressure within the capstan and produces a vacuum or pressure differential at those capstan openings 68 not covered by the ears 110 of the central support 70. This, in effect, creates an air flow through the aforementioned capstan openings at the portion of the capstan adjoining the tape 22. This vacuum, in turn, draws the tape 22 against both the capstan 48 and the magnetic transducer head 52. Consequently, at this time, the capstan provides a smooth, continuous advancement of the tape 22 across the transducer 52 while the takeup spool 18 winds up the advancing tape with the photographic film 20 as explained in the aforementioned copending application.

The length of the tape 22 relative to the photographic film 20 as explained in the aforementioned application, permits formation of isolating loops in the tape so that the intermittent advancement of the film is isolated from the just-described continuous advancement of the tape 22.

Advantageously, the audio system 10 efficiently drives the tape 22 and records or plays back audio information while providing tape contact over a contiguous short portion of the tape itself. That is, the mass of the structure which contacts and drives the tape is concentrated along the motor output axis and tape contact is provided at points radial therefrom so that tape engagement surrounds the transducer head and mechanical disturbances are reduced. This tends to reduce flutter which is often introduced by spaced engaging portion of conventional audio drive systems. In this regard, it should be noted that not only are the drive engagement and head contact substantially coextensive with a limited portion of the tape, but further conventional backup plates for supporting the tape which may also introduce mechanical vibrations in the tape have been eliminated. Further, since the novel system provides means for attracting the tape to the capstan, it is also particularly well suited for self-threading arrangements and for tape systems where the tape is wholly retained within a cassette.

A still further advantage of this system is that any termination of the vacuum eliminates the tape engagement with the capstan and thereby permits tape rewind and the like without any mechanical movement of the audio tape system. This is particularly advantageous in the described audio-visual system where rewind is employed for processing of the film strip. In the present arrangement, wherein the vacuum producing means is directly coupled to the capstan drive motor, the stopping of the motor not only stops rotation of the capstan drive, but also eliminates the vacuum which will allow the tape 22 to drop back within the cassette where it will be again supported by the support member 38 during rewind of the tape and film back to the supply spool 16.

While there are many ways of assembling the illustrated device, it is intended that the capstan member 64 be first fixed to the drive shaft 80 in close proximity to the motor 56 and secured thereon by, for example, welding of a flange portion 116 of this member to the output shaft. The sleeve 86 is then secured to the capstan member 84 as shown by welding of a sleeve flange 118 thereto. Next, the support 70 with its head 82 previously secured therein and with leads therefrom (not shown) brought through the support (for example, through the top portion thereof as viewed in FIG. 2, for extension to appropriate recording and playback circuitry) is placed over the sleeve. The opposite end of the sleeve 86 need not be additionally fastened to the shaft 80, but is preferably so fastened through the castillated ring 90. A flange 122 carried at this end of the sleeve 86 simplifies assembly of the second capstan member 62 which may, for example, be welded to this flange.

Once the capstan and transducer unit have been assembled to the motor 56, the pump 58 with its gear 98 is placed on the motor output shaft. The bracket 72 is then secured to the motor 56, the support member 70 (as shown at 124), and the pump 58 by any suitable means such as bolts, welds or other arrangements to maintain these components in fixed relation while permitting rotation of the assembled capstan 48 and the pump vanes 104. The gear train 60 is then assembled on the pump with the gear frame 74 secured to the pump and main bracket 72 by welding or other suitable arrangement. To complete the device, the bracket 72 is secured within its housing 42 as, for example, by rivets or other suitable means at the top of the bracket 74. Of course, the bracket and motor could be cantilevered from a rear wall (not shown) of the housing. Moreover, rather than rigidly being fixed to the housing 42, the unit 40 may be movably suspended thereon with spacer members provided from the bracket 72 or any fixed portions of the unit to provide standoffs for supporting the unit over the cassette.

In the above-noted arrangement, the capstan is mounted between the motor and pump; however, the latter may adjoin the motor. Additionally, one capstan member, for example member 62, may be sufficient. In the latter embodiment, the support 70 is employed to provide tape support and a side guide in the area previously provided by the eliminated capstan member 64.

In the above-described preferred embodiment, the motor, capstan and vacuum pump are mounted in an integral unit to provide as compact a device as possible and to concentrate the mass along a single axis normal to the direction of tape movement. However, it should be noted that the vacuum capstan and transducer arrangement will still retain many of its advantages if the vacuum producing means is mounted separately therefrom with communication to the capstan through a flexible inlet.

As illustrated herein, the vacuum is directed to the tape surfaces which engage the capstan so as to provide frictional engagement therebetween. Additionally, however, small openings, conduits or side channels (not shown) may extend from the tape engaging face of the head 52, through the head and the adjoining portions of the support member 70 to the capstan chamber to provide a relatively slight vacuum at the transducer face so as to reduce the air layer between the transducer and the tape.

Those familiar with audio tape systems and sound motion picture arts will readily appreciate the novel and highly unique advantages of the described audio system employing a highly compact transducer and drive unit having its mass concentrated along a given axis substantially normal to the film movement and providing tape drive and transducer engagement to a single portion of limited length of the film strip. Advantageously, the above and the use of a vacuum or differential pressure within the capstan to draw the tape into contact with both the capstan and the transducer head provides a highly efficient device for advancing the tape across the magnetic head while minimizing flutter.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A tape drive and transducer system for recording of information on or providing playback from a recording tape, said system having drive means responsive to engagement with said tape for advancing said tape in a given direction, a transducer for facilitating recording or playback of audio information responsive to engagement with said tape during its said advancement therepast, and means for urging said tape into engagement with said drive means and said transducer, the improvement wherein said drive means and said transducer are combined in adjoining relation to one surface of said tape with their respective areas of engagement with said tape in a side-by-side arrangement generally lateral to said given direction and wherein said urging means includes means acting at least in part through said drive means for attracting said tape into engagement with said combined drive means and transducer and thereby concentrate the mass of said system at this point so as to reduce flutter in said recording or playback.

2. The system of claim 1 wherein said attracting means is a vacuum.

3. The system of claim 1 wherein said drive means includes a rotatably mounted capstan arranged for driving engagement of a peripheral portion thereof with a given length of said tape, and said transducer is fixedly mounted alongside said capstan so as to engage a portion of said tape laterally adjoining said given length, said capstan including a plurality of openings around its peripheral portion, and said urging means includes means for reducing the pressure within said capstan so as to attract the tape into engagement with the periphery of said capstan and said fixedly mounted transducer.

4. The system of claim 3 wherein said drive means includes a pair of spaced capstan members arranged for driving arrangement of a peripheral portion thereof with a given length of said recording medium, said peripheral portions of said capstan members having openings therein, and means for supporting said capstan sections for synchronous rotation in spaced apart arrangement whereby each of said capstan members engage opposed lateral margins of one surface of the tape strip and for mounting a transducer fixedly located between said capstan members and for concentrating said reduced pressure at the openings in said capstan members which are adjacent said transducer.

5. The system of claim 4 including a motor for driving said capstan, and said means for supporting said capstan members includes the output shaft of said motor.

6. The system of claim 5 including a vacuum pump for reducing the pressure within said capstan, and said pump is also mounted on said output shaft of said motor so as to concentrate the mass of said system on the axis of said output shaft.

7. A tape drive and transducer system for recording information on or providing playback from a recording tape, a capstan arranged for driving engagement of a peripheral portion thereof with a given length of said tape, a motor for driving said capstan, a transducer for facilitating recording or playback of information responsive to advancement of said tape therepast, and means for urging said tape into engagement with said capstan and said transducer, the improvement wherein said capstan is mounted on the output shaft of said motor, and said transducer is fixedly mounted alongside said capstan so as to engage a portion of said tape laterally adjoining said given length, and said urging means includes means for providing a reduced pressure within said capstan such that the mass of said system is concentrated along the axis of said output shaft.

8. The system of claim 7 wherein said capstan is hollow and said urging means is a vacuum pump mounted on said output shaft and having an inlet coupled to said hollow interior so as to produce a reduced pressure therein.

9. The system of claim 7 wherein said capstan is located on said output shaft between said motor and said pump.

* * * * *